2,874,027

PREPARATION OF ALKALI METAL PHOSPHATES

Gunter H. Gloss, Mundelein, Ill., assignor to International Minerals & Chemical Corporation, a corporation of New York No Drawing. Application May 7, 1956
Serial No. 582,932

6 Claims. (Cl. 23—107)

This invention relates to a method of preparing alkali metal phosphates. More particularly, it relates to a method of preparing alkali metal polymetaphosphates. Still more particularly, it relates to a flame-spray method of producing alkali metal polymetaphosphates.

Numerous processes have been developed for the preparation of alkali metal phosphates. In one method a solution of an alkali metal salt and a phosphate is evaporated to form a molten mass, which is quickly quenched to produce an alkali metal polyphosphate in a glass-like form. One disadvantage of this method is that the molten mass is extremely corrosive. Therefore, the capital and maintenance costs of the equipment for carrying out the process are relatively high. Another disadvantage of this method is that the glass produced after quenching must be further treated by grinding and the like to put it into a form suitable for use as a detergent component or fertilizer.

Another method has been devised in which a solution of an alkali salt and a phosphate is evaporated by spray drying to form a solid alkali monophosphate. In this method, the solution is evaporated to dryness by spraying it into a stream of combustion gases. Although this method may be an effective means of producing a solid alkali monophosphate, it cannot be readily utilized to produce polymeric phosphates such as alkali polymetaphosphates and other alkali phosphates which form at temperatures above about 700° C.

It is an object of this invention to overcome the disadvantages of previous known methods of producing alkali metal phosphates.

It is another object of this invention to provide an alkali metal polymetaphosphate from low cost raw materials.

It is still another object of this invention to provide a method in which the fusion of an alkali metal polymetaphosphate and the vaporization of hydrochloric acid eliminates the chloride ion simultaneously therewith.

It is still another object of this invention to provide a less expensive method of producing an alkali metal polymetaphosphate having a sequestering action equivalent to that of tripolyphosphates currently sold commercially.

It is still another object of the invention to provide a means of recovering hydrochloric acid from an alkali metal chloride.

These and other objects of the invention will be apparent to those skilled in the art from the following description.

It has been discovered that when a solution of an alkali metal chloride and phosphoric acid is prepared and the resulting solution is sprayed in droplet form into a flame, a reaction occurs which produces a glassy alkali metal polymetaphosphate, and a gas containing HCl and water vapor. The solid material has a sequestering action equivalent to alkali polyphosphates currently sold in commerce. The HCl gas may be recovered and absorbed in water to produce a solution of hydrochloric acid.

More in detail, the phosphoric acid used to react with the alkali metal chloride should have a $P_2O_5$ concentration less than about 35%, and preferably between about 20% and about 25%. It is possible, by the instant process, to produce an alkali metal polymetaphosphate from an acid having a $P_2O_5$ concentration less than 20%. However, from the standpoint of economy it is preferable to first evaporate acid having a $P_2O_5$ concentration less than about 20% by conventional methods such as steam, combustion gases and the like. When the $P_2O_5$ concentration of the phosphoric acid is between about 25% and about 35%, the alkali metal chloride, when added as a solid, does not always dissolve completely in the acid, and further dilution with an aqueous medium is required to completely dissolve the solid. When the $P_2O_5$ concentration of the acid is greater than about 35%, addition of a solid alkali metal chloride frequently causes the formation of a gel-like material. When the $P_2O_5$ concentration of the acid is between about 20% and about 25%, solid alkali metal chloride may be readily dissolved by agitating the mixture, and there is little likehood of a gel-like material being formed.

Phosphoric acid used in the process may be produced by the well-known "wet process" or a modification thereof. In these processes phosphate rock is reacted with sulfuric acid and the reaction mixture is leached with an aqueous medium to recover a dilute phosphoric acid. Phosphoric acid produced by the "furnace process" and the like may also be used in the process. For the reasons discussed above it is preferred to adjust the $P_2O_5$ concentration of the acid produced by either of the above processes to between about 20% and about 25% before dissolving the alkali metal chloride. The adjustment of the concentration can be made by evaporation of the acid using conventional means or by dilution of the acid with an aqueous medium, the choice of the means of adjusting the $P_2O_5$ concentration depending upon the concentration of the starting acid.

An alkali metal chloride, such as potassium chloride, sodium chloride, and lithium chloride may be mixed with the phosphoric acid. Sufficient alkali metal chloride is added to the acid to give a mol ratio of alkali metal to phosphorus of between about 0.6:1 and about 1:1, and preferably between about 0.8:1 and about 1:1. When the mol ratio is greater than about 1:1, the excess alkali metal chloride is not completely reacted and contaminates the final product.

The alkali metal chloride in solid form may be dissolved in the phosphoric acid to form a homogenous solution. Although the process may be carried out with a solution containing undissolved alkali metal chloride, for example, when the $P_2O_5$ concentration of the starting acid is between about 25% and about 35%, this practice is not preferred since the solid particles may clog the spray nozzles and the undissolved alkali metal chloride may not react with the phosphoric acid.

The solution containing the alkali metal chloride and phosphoric acid is passed through an atomizer or spray nozzle directly into a flame to cause the reaction that will produce a polymerized alkali metal metaphosphate and HCl. For reasons of product recovery it is preferable that large droplets be sprayed into the flame. Therefore, the degree of atomization should be controlled to minimize the formation of a fine mist.

The flame temperature should be maintained between about 2500° F. and about 4500° F., and preferably between about 3000° F. and about 4000° F. It is preferred to employ a flame resulting from the combustion of gaseous fuel, such as natural gas, ethane, butane, propane and the like, with air, oxygen or a free oxygen-containing gas. Flames resulting from the combustion of liquid fuels such as gasoline, alcohol, and the like, with air or other free oxygen-containing gases are also contemplated.

When the solution of alkali metal chloride and phosphoric acid is sprayed into a flame of this type, a reaction occurs instantaneously in which the major portion of the alkali metal and phosphatic components combine to form a solid glassy alkali metal polymetaphosphate having the formula $(KPO_3)_x$. In addition, gaseous HCl is formed and water is evaporated.

The flame obtained by the burning of fuel gases on a burner usually contains three zones or cones. The inner zone contains the unburned gas, and the intermediate zone is an area of incomplete combustion. In the outer zone combustion occurs to produce the luminous part of the flame. The temperature of the flame is different in each zone. The inner zone of the flame is considered to be the coldest part of the flame, and the area of the combustion zone adjacent to the intermediate zone is considered to be the hottest part of the flame. Some of the factors which affect the shape and relative sizes of the three zones are the fuel, the gas pressure and the type of burner that is used. When the specification refers to "flame" or "flame zone," it will be recognized that reference is being made to the hottest zone of the flame, i. e., the area of the combustion zone adjacent to the intermediate zone.

The degree of polymerization of the solid product varies with the temperature of the flame and the length of time the reactants are in the flame. Increasing the flame temperature and the length of time the reactants are in the flame will increase the degree of polymerization. The direction in which the solution is sprayed into the flame may be varied to control the length of time the reactants remain in the flame zone.

If the solution is sprayed into the flame in a direction concurrent to the direction of the flame, maximum exposure of the solution to the flame zone can be obtained. When the solution is sprayed in a direction perpendicular to the direction of the flame, the minimum exposure to the flame zone can be obtained. The angle between the path of the solution and the path of the flame may be adjusted to give a solid product having the desired physical and chemical properties.

If desired the solution may be sprayed through a series of flames, for example, the solution may be sprayed downward into a cylinder equipped with several burners positioned at different heights on the periphery of the cylinder and which project flames toward the vertical axis of the cylinder.

The solid glassy alkali metal polymetaphosphate is collected at a point below the flame. The solid may be collected in a cylindrical container having a conical shaped bottom and a raking mechanism to collect and convey the solid material to the apex of the cone where is is removed.

The solid material is a glassy alkali metal polymetaphosphate which has a sequestering action equivalent to the tripolyphosphates currently sold commercially. The solid is in free-flowing powder form and need not be treated by grinding and the like to put it in a form suitable for use as a component of detergents. When potassium chloride is used as a reactant, the resulting polymerized potassium metaphosphate may also be used as a fertilizer ingredient.

The gas phase, which contains gaseous HCl, water vapor, fine solid particles of the alkali polymetaphosphate, and combustion gases, may be separately collected from the reaction and treated by one of several methods to recover the HCl. The vapor phase may be passed through a cyclone separator, Cottrell precipitator and the like to separate the solids, and then scrubbed in an aqueous medium to recover a solution of hydrochloric acid. Another modification comprises scrubbing the vapor phase in a dilute phosphoric acid solution to separate the solids. Part of the HCl and water vapor is also absorbed in the phosphoric acid, but the unabsorbed gas may be collected in water to recover a solution of hydrochloric acid. The phosphoric acid containing HCl and the solids may be recycled to dissolve the alkali metal chloride.

In the preferred embodiment of the invention, utilizing the least expensive of raw materials, an impure aqueous solution of phosphoric acid, such as is obtained by reaction of Florida phosphate rock and sulfuric acid, is used to dissolve potassium chloride in a mol ratio of the order of about 1 mol K to 1 mol P. The solution is passed through a nozzle and sprayed into a flame which is maintained at about 3400° to 3600° F. The flame is produced by burning a mixture of propane and oxygen in air. The solution is sprayed from a point above and adjacent to the flame, so that the droplets travel in a direction concurrent ot the direction of the flame. The solid particles are recovered and stored for use as a detergent component or as a fertilizer. The vapor phase is scrubbed in a dilute solution of phosphoric acid to separate the fine solids. The gas from the phosphoric acid scrub is scrubbed with water to recover a solution of hydrochloric acid.

The invention will be further understood from the following example, which is given by way of illustration and without any intention that the invention be limited thereto.

*Example*

Florida phosphate rock was reacted with sulfuric acid to produce a dilute phosphoric acid having the following analysis:

| Component: | Percent by weight |
|---|---|
| $P_2O_5$ | 26.4 |
| $Al_2O_3$ | 1.1 |
| $Fe_2O_3$ | 0.7 |
| $CaO$ | 0.9 |
| $F_2$ | 1.9 |

To about 1640 parts of this acid was added about 200 parts of water and about 448 parts of solid potassium chloride, to give a solution having a KCl to P mol ratio of about 1. The mixture was stirred to dissolve the KCl. An aspirator was connected to the solution, having a nozzle with an opening of about 1.5 mm. Air at about 12–18 p. s. i. g. was passed through the aspirator to carry the solution to the nozzle and to direct the droplets into the flame. The flame was produced by igniting a mixture of propane and oxygen in air. The propane pressure was about 14 p. s. i. g. and the oxygen pressure was about 30 p. s. i. g. The nozzle was placed so that the spray of solution travelled in a direction which was approximately concurrent to the path of the flame. The flame temperature was about 3500° F. The solid product recovered in the process had the following chemical analysis:

| Component: | Percent by weight |
|---|---|
| Total $P_2O_5$ | 57.4 |
| $K_2O$ | 42.0 |
| Cl | 0.4 |

Analysis also indicated that about 76% of the solid was in the form of higher polymerized potassium metaphosphate, $(KPO_3)_x$.

The product was treated in accordance with the procedure described in Analytical Chemistry, vol. 18, No. 7, pages 411–415, July 1946, to prove its sequestering action. Four grams of solids were dissolved in distilled water and the solution diluted to 250 ml. The dilute solution was filtered to remove insoluble material. Twenty-five ml. of the filtered solution was diluted to 45 ml. and the pH adjusted to 10 with sodium hydroxide. The pH adjusted solution was transferred to the photoelectric colorimeter and titrated with calcium chloride solution containing ¼ gram of calcium per 100 ml. of solution to the cloud point. The product prepared in the example had a calcium value of 9.0. The calcium value of a commercial grade sodium tripolyphosphate was found to be about 10.

Having thus described my invention, what I claim is:

1. The method of preparing a glassy alkali metal polymetaphosphate which comprises preparing a solution of an alkali metal chloride and phosphoric acid, said solution having an alkali metal to phosphorus mol ratio of between about 0.6 and about 1.0, spraying the solution in droplet form into a flame having a temperature between about 2500° F. and about 4500° F. to produce a solid glassy alkali metal polymetaphosphate and separately collecting the gas phase which contains gaseous hydrochloric acid.

2. The method of claim 1 wherein said solution has an alkali metal to phosphorus molar ratio of between about 0.8:1 and about 1:1.

3. The method of preparing a glassy alkali metal polymetaphosphate which comprises preparing a solution of an alkali metal chloride and phosphoric acid, said solution having an alkali metal to phosphorus mol ratio of between about 0.6 and about 1.0, spraying the solution in droplet form into a flame having a temperature between about 3000° F. and about 4000° F., recovering a solid glassy alkali metal polymetaphosphate, and separately collecting the gas phase which contains gaseous hydrochloric acid.

4. The method described in claim 3 where the alkali metal chloride is potassium chloride and the glassy alkali metal polymetaphosphate is potassium polymetaphosphate.

5. The method of preparing a glassy alkali metal polymetaphosphate which comprises preparing a solution of an alkali metal chloride and phosphoric acid, said solution having an alkali metal to phosphorus mol ratio of about 1.0, spraying the solution in droplet form into a flame having a temperature between about 3400° F. and about 3600° F., recovering a solid glassy alkali metal polymetaphosphate and separately collecting the gas phase which contains gaseous hydrochloric acid.

6. The method described in claim 5 where the alkali metal chloride is potassium chloride and the glassy alkali metal polymetaphosphate is potassium polymetaphosphate.

References Cited in the file of this patent
UNITED STATES PATENTS

| | | |
|---|---|---|
| 2,142,944 | Kerschbaum | Jan. 3, 1939 |
| 2,288,418 | Partridge | June 30, 1942 |
| 2,419,148 | King | Apr. 15, 1947 |